United States Patent [19]
Letts

[11] Patent Number: 5,891,563
[45] Date of Patent: Apr. 6, 1999

[54] POLYISOCYANURATE BOARDS WITH REDUCED MOISTURE ABSORBENCY AND LOWER AIR PERMEABILITY AND RELATED METHODS

[75] Inventor: John B. Letts, Carmel, Ind.

[73] Assignee: Bridgestone/Firestone, Inc., Akron, Ohio

[21] Appl. No.: 727,812

[22] Filed: Oct. 8, 1996

[51] Int. Cl.[6] .............................. B32B 17/10; B32B 5/18
[52] U.S. Cl. .................. 428/318.4; 428/140; 428/306.6; 428/307.3; 428/318.8; 428/304.4; 428/317.9
[58] Field of Search .................................. 428/140, 139, 428/304.4, 317.9, 306.6, 307.3, 318.4, 318.8; 156/71

[56] References Cited

U.S. PATENT DOCUMENTS

| | | | |
|---|---|---|---|
| 3,512,819 | 5/1970 | Morgan et al. | 278/189.36 |
| 3,842,559 | 10/1974 | Payne | 52/309 |
| 4,037,006 | 7/1977 | Roberts et al. | 428/71 |
| 4,052,831 | 10/1977 | Roberts et al. | 52/309 |
| 4,357,384 | 11/1982 | Jasperson | 428/215 |
| 4,388,366 | 6/1983 | Rosato et al. | 428/285 |
| 4,449,336 | 5/1984 | Kelly | 52/105 |
| 4,599,258 | 7/1986 | Hageman | 428/494 |
| 4,944,818 | 7/1990 | Dybsky et al. | 156/71 |
| 5,001,005 | 3/1991 | Blanpied | 428/283 |
| 5,081,810 | 1/1992 | Emmert | 52/221 |
| 5,102,728 | 4/1992 | Gay et al. | 428/26 B |
| 5,112,678 | 5/1992 | Gay et al. | 428/26 B |
| 5,192,598 | 3/1993 | Forte et al. | 428/71 |
| 5,220,762 | 6/1993 | Lehnert et al. | 52/408 |

*Primary Examiner*—Richard Weisberger
*Attorney, Agent, or Firm*—Frank J. Troy, Sr.

[57] ABSTRACT

A composite iso board (10) comprises a foam core (11) selected from the group consisting of polyisocyanurate and polyurethane materials and mixtures thereof; and first and second facers (12, 13), between which the foam core is sandwiched, the facers comprising a sheet selected from the group consisting of polyamides and polycarbonates. A method of reroofing a roof comprises applying composite iso boards of the present invention to a roof deck; and, applying a weather protective layer over the iso boards. A continuous method of making a composite iso board comprising the steps of feeding a first layer of facer material into a laminator (24); depositing a foamable polymer liquid onto the first layer (12); feeding a second layer of facer material (13) into the laminator above the foamable polymer liquid; allowing the polymer liquid to rise between the first and second facer materials forming polymer foam (42) of a predetermined thickness; curing the polymer foam under heat to create the iso board; cutting the iso board to desired lengths; and stacking said boards in bundles.

10 Claims, 2 Drawing Sheets

POLYISOCYANURATE BOARDS WITH REDUCED MOISTURE ABSORBENCY AND LOWER AIR PERMEABILITY AND RELATED METHODS

TECHNICAL FIELD

This invention relates to polyisocyanurate boards suitable for use as insulation or as a recovery board within a roof system as well as insulation boards in walls. Particularly, the present invention relates to a polyisocyanurate board having reduced moisture absorption and air permeability which, in turn provides improved dimensional stability and R-value.

BACKGROUND OF THE INVENTION

Roof construction in a low-pitched roof generally consists of a roof deck, an insulation barrier above the deck, a weather resistant layer applied to the insulation layer, and optionally a layer of heat resistant material. The roof deck generally includes materials such as wood, gypsum, concrete, steel, and the like. Above the roof deck, insulation boards are typically applied to provide thermal insulation and a uniform surface to which the weather protective layer is applied.

There are generally two types of roofing situations, one is a new roof construction and the other is where an existing roof is being reroofed, which typically occurs when the existing roof is leaking. Insulation boards employed in reroof situations are generally referred to as recovery boards. Recovery boards can also be made with a variety of core materials that are typically coated with a protective facer that can be either rigid or flexible and can be fire or flame-retardant. In a reroofing operation, the roof deck can refer to the existing roof, including the existing insulation and weather resistant layer.

Recovery boards are generally applied to an existing roof deck assembly to provide a uniform surface when recovering an existing roof. The existing roof is typically hot and wet, and the environmental conditions in which the reroof takes place is typically hot, humid, and wet. The most common recovery boards are made of woodfiber or extruded polystyrene. The woodfiber is typically coated with a thin layer of asphaltic material on one side, and those recovery boards that are made of polystyrene typically do not contain a facer. While insulation boards are typically not affected by environmental conditions during the construction of a new roof, the hot and damp conditions encountered during reroof situations can warp the facers of many recovery boards.

To seal the roof from the elements, recovery boards are typically covered with various materials including molten asphalt, modified bitumen membrane, rubberized asphalt, or an elastomeric composition such as EPDM (ethylenepropylene diene monomer). Not all sealing materials, however, are compatible with each type of recovery board. For example, molten asphalt can not be used with extruded polystyrene. Correct combinations of sealing material and recovery board are known to those skilled in the art. The heat resistant layer of material, which is generally applied directly to the weather resistant layer, can include gravel, river stone, foam or a layer of mastic followed by granules.

Application of the weather protective layer can be accomplished by a number of means, usually dictated by the type of material employed. For example, sheets of a protective membrane can be rolled out over the roof and bonded together by torching or the use of an adhesive.

Although inexpensive and generally in wide use, woodfiber and polystyrene-containing insulation or recovery boards are often ineffective in hot, humid and wet environments. Particularly, woodfiber boards will disintegrate in a wet, humid environment, which is common in a reroof operation. Polystyrene will expand, bow, or distort in similar environments, especially when exposed to the extreme heat experienced upon roofs in warmer climates.

The patent literature does include panels and boards used for roofing operations. Built-up roof constructions and the components thereof, for example, are well-known in the art as generally explained in Blanpied, U.S. Pat. No. 5,001,005, Dybsky et al., U.S. Pat. No. 4,944,818, and Rosato et al., U.S. Pat. No. 4,388,366. With regard to insulation boards, Blanpied teaches a rigid foam board comprising a thermosetting plastic foam sandwiched between two facers; the facer comprising glass fibers, non-glass filler, and non-asphaltic binder. Likewise, Dybsky et al. teaches a composite roofing substrate panel comprising a core of combustible material such as fibers or foams and a facer of noncombustible material such as glass fibers coated with a bituminous material. Rosato et al. teaches a laminate insulation board comprising a plastic foam core and at least one facer sheet forming both a protective layer and a venting means for fluids; the facer sheet comprising fine glass fibers bonded together with polyvinyl acetate.

All existing polyisocyanurate boards, or iso boards as they are sometimes known, employ facers on the two parallel sides with the largest surface areas. A facer usually consists of a composite with paper, fiberglass and various binders and additives. The standard facer is an approximate composition of 80 percent by weight recycled paper, 15 percent by weight fiberglass and 5 percent by weight additives and binders. These fiberglass facers actually contain minimal fiberglass as a reinforcement for the facer or sheet material. The high paper content of this facer yields a facer that readily absorbs water, which is not desirable in a polyisocyanurate insulation board. These standard facers typically absorb as much as 60 percent by weight water per ASTM C209. Additionally, these standard facers are very permeable to gases such as oxygen subsequent to foaming of the polyisocyanurate, which diminishes the insulative or R-value properties of the iso board. For example, it has been shown that many hundred and perhaps thousands of cubic centimeters per hundred square inches of oxygen can permeate a standard facer within 24 hours per ASTM D3985.

Thus, a need exists for an iso board which is stable throughout the manufacturing process and more moisture resistant. The use of a composite which contains isocyanurate and/or urethane foam between facers that comprise a polymer, such as polyamide 6,6, optionally reinforced with glass strands or glass fibers and optionally a filler material, such as calcium carbonate, clay, mica and the like, and optionally various dyes or colorants, makes the iso board of the present invention dimensionally stable, relatively insensitive to moisture in reroofing and, reduced air permeability which improves the R-value.

SUMMARY OF INVENTION

It is therefore, an object of the present invention to provide a composite iso board that is relatively inexpensive, with improved physical properties, that is dimensionally stable in hot, humid and wet conditions.

It is another object of the present invention to provide a composite iso board having facers comprising a plastic that provides advantages over existing paper/fiberglass facers.

It is yet another object of the present invention to provide an iso board with plastic facers which provides improved insulation properties on roofs and in walls.

It is another object of the present invention to provide a composite iso board that can withstand the heat produced during manufacture.

It is another object of the present invention to provide a composite iso board having plastic facers which reduce the air permeability of the board.

It is another object of the present invention to provide a composite iso board having plastic facers that inhibits off-gassing subsequent to foaming and therefore provides improved insulation properties.

It is yet another object of the present invention to provide a method for reroofing utilizing a composite iso board having plastic facers.

It is still another object to provide a method for manufacturing iso boards of the present invention.

At least one or more of the foregoing objects of the present invention together with the advantages thereof over the existing iso boards, which shall become apparent from the specification that follows, are accomplished by the invention as hereinafter described and claimed.

In general the present invention provides a composite iso board comprising a foam core selected from the group consisting of polyisocyanurate and polyurethane materials and mixtures thereof; and first and second facers, between which the foam core is sandwiched, the facers comprising a sheet selected from the group consisting of polyamides and polycarbonates.

The present invention also includes a method of reroofing a roof comprising applying composite iso boards to a roof deck, the composite iso boards comprising a foam core selected from the group consisting of polyisocyanurate and polyurethane materials and mixtures thereof; and first and second facers, between which the foam core is sandwiched, the facers comprising a polymer selected from the group consisting of polyamides and polycarbonates; and, applying a weather protective layer over the iso boards.

Finally, the invention provides a continuous method of making a composite iso board comprising the steps of feeding a first layer of facer material into a laminator; depositing a foamable polymer liquid onto the first layer; feeding a second layer of facer material into the laminator above the foamable polymer liquid; allowing the polymer liquid to rise between the first and second facer materials forming polymer foam of a pre-determined thickness; curing the polymer foam under heat to create the iso board; cutting the iso board to desired lengths; and stacking them in bundles.

PREFERRED EMBODIMENT FOR CARRYING OUT THE INVENTION

Figure 1:
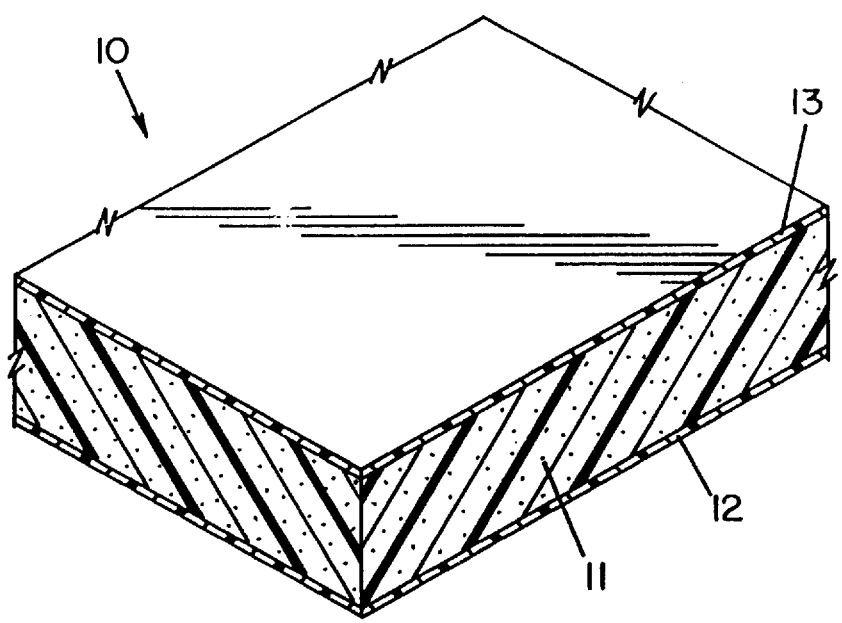
FIG. 1 is a perspective view of a composite iso board in accordance with the present invention.

The present invention is directed toward a composite iso board that is useful to roof a new roof or reroof an existing roof. The roofing member is applied to a roof deck which is substantially flat or low-pitched, and which can be newly constructed, or which is exposed by the removal of old roofing or, which is an existing roof system in suitable condition for recovering. Inasmuch as roof decks are known and do not constitute part of the present invention, other than as a substrate or base upon which the roofing members are laid, further detail is not necessary. In addition, the composite iso board can be used as an insulation board in walls.

One common problem in most if not all reroof installations is a wet and often somewhat deteriorated roof or substrate. Typically, when a leak is noticed, and certainly when it is deemed necessary to repair, use of the iso board of the present invention provides an inexpensive and facile means of reroofing either the affected area or more commonly, the entire roof. Thus, the roofing member must have sufficient integrity to patch or cover the roof; it must provide a good base for subsequent application of the final layer or covering, such as an EPDM roofing membrane; and, it must be compatible with the latter and the respective means of application. Additionally, the roofing member should desirably possess decreased air permeability, improved insulation values and, increased resistance to moisture.

In other words, a board placed over the old roof to act as a substrate for the new waterproof membrane will typically become wet. Existing boards made from wood fiber, extruded polystyrene will distort and/or deteriorate, necessitating further reroofing efforts. Existing boards manufactured from isocyanurate foams would fare better, except the current state of the art has been to utilize paper facers that also absorb water, causing untimely failure of the board in certain situations where moisture is encountered. Existing facers which contain organic felt materials, provide a wicking action through the facer. While such problems can be minimized by drying the roof before repair, or by waiting for it to dry, this is not often practical.

Other facer materials have employed glass and fiberglass reinforcement with urea/formaldehyde resin as a binder; however, these "all glass" facers as they are sometimes referred, are notorious for a condition known as "strike through" during the manufacturing process. When this occurs, the foam can more readily penetrate through the facer and reach the lamination equipment, causing it to freeze up as well as creating other manufacturing problems. This weakness has been somewhat attributed to the industries' usage of polymers as bonding agents that are porous to permit venting of gases and vapors. Polyvinyl acetate, for example, is often utilized as the bonding agent to provide such porosity in facers reinforced with glass. In addition, the polymer sheet material does little to resist the influx of air or the emission of blowing agents in the foam; hence, air permeability is increased which has a deleterious effect on insulation properties i.e., decreased R-value.

The iso board according to the present invention is best described with reference to FIG. 1. Such a board is indicated generally by the numeral 10 and comprises a foam core 11 sandwiched between a lower facer 12 and an upper facer 13. The boards 10, when used for recovery applications, are generally from about 0.5 to about 4 inches thick, more preferably from about 0.5 to about 1.5 inch thick, and most preferably from about 0.5 to about 1 inch thick; and can be fabricated in various dimensions depending on the intended application. Likewise, when the boards are used as insulation, the thickness ranges from about 0.5 to about 4 inches thick, depending upon the required insulation value. Boards fabricated into sheets 4 feet wide and 8 feet long are best suited for compatibility in the building trade, for reroofing or in walls.

The foam core 11 can be polyisocyanurate, urethane, or mixtures thereof. The foam core is generally of standard production and generally includes those having an index of about 250. Particularly, when polyisocyanurate foam is employed, those having an index above 200 are preferred; and when urethane is employed, an index above 120 is preferred. Further, mixed foams can be employed, such as a mixture of polyisocyanurate and urethane.

The lower facer 12 and upper facer 13 of the present invention comprise a plastic that is heat stable to temperatures of about 300° F. The facers of this invention do not melt at those temperatures, although some minor wrinkling may occur. The upper and lower facers of the present invention comprise polymer material, which is formed as a polymer sheet. Particularly, the plastic polymer material can include a polyamide, preferably polyamide 6,6. Polyamide 6,6, or poly(iminoadipoyl-iminohexamethylene), is the condensation product of hexanedioic acid and 1,6-diaminohexane. Typical examples of polyamide 6,6 films that can be used are C-917, a cast film; T404A, an oriented film; SF502 and C302, corona and heat treated films, respectively, all available from Dupont Canada, Inc. Thicknesses of the facers typically range between about 0.0005 and 0.05 inch (0.5 and 50 mils).

Although polyamide 6,6 and its analogs are preferred, other polyamides such as polyamide 6, or poly(imino(1-oxohexamethylene)), which is a polymer of caprolactam, can be used. It should be appreciated that polyamide 6,6 is preferred because it is thermally more stable than polyamide 6. Other examples of polyamides include polyamide 11, [poly(imino(1-oxoundecamethylene))], polyamide 12, [poly(imino(1-oxododecamethylene))], and polyamide 6,10, [poly(iminohexamethylene-iminosebacoyl].

Any polyamides that meet the requirements of heat stability at 300° F. and moisture resistance no worse than about 80 percent of polyamide 6,6 can be used. Although not absolutely required, low air permeability of the order of polyamide 6,6 is very desirable. In the case of polyamides such as polyamide 6,6, the carbon linkages between the diamine groups $R^1$ can vary and the carbon linkages between the dicarboxylic acid groups $R^2$ can vary. The carbon linkages $R^1$ and $R^2$ can include, but are not limited to, $(CH_2)_2$ through $(CH_2)_{14}$ and their isomers.

Generally, aromatic carbon linkages will not be as thermally stable especially if they are adjacent to the amine or carboxylic acid groups. A two carbon linkage, $(CH_2CH_2)$ group between the aromatic group and the amine or carboxylic acid group is desirable. In the case of polyamides such as polyamide 6, where the amine and carboxylic acid is on the same molecule, the carbon linkages $R^3$ can vary from $(CH_2)_4$ through $(CH_2)_{12}$ and their isomers. In all of these cases, the previous requirements of heat stability to 300° F. and moisture resistance is needed. Furthermore, polycarbonates, such as poly(4,4-isopropylidene diphenylene carbonate), can also be employed in lieu of the polyamides although they are not as strong as the polyamides and adhesion to urethane foams is not as desirable. Other polymers can be added to modify or adjust the performance of the polyamide and polycarbonate polymers, such as heat stability thereof.

The polymer material can also include reinforcing materials such as glass strands, glass fibers, or mixtures thereof. Amounts of such reinforcing materials range from about 100 to about 10,000 parts by weight, based upon 100 parts by weight of the polyamide polymer selected to form the facer. Furthermore, the reinforced polymer material can optionally include fillers such as clay, mica, talc, limestone (calcium carbonate), gypsum (calcium sulfate), aluminum trihydrate, antimony oxide, cellulose fibers, plastic polymer fibers, and mixtures thereof. Amounts of such fillers range from about 0 to about 5,000 parts by weight, based upon 100 parts by weight of the polymer selected to form the facer. Also, dyes or colorants can be added at the appropriate level to render the film opaque or aesthetically pleasing. One of skill in the art can readily, without undue experimentation, determine such levels.

The facers of the present invention have been found to impart weatherability and durability to iso boards used as roofing substrates within a roof system. Particularly, the facers of the present invention have been found to provide dimensional stability to the boards, inhibiting the boards from distorting under high heat and moisture. In addition to dimensional stability, the facers protect the foam from moisture, as well as from physical penetration. Because of these advantages, the use of polyamide facers has been found to be particularly beneficial with recovery boards because the environment commonly encountered in a reroof operation is hot, humid and often wet. Moreover, the optional fillers add strength to the facer and provide the facer with a rugged appearance.

The iso boards 10 are typically applied to the roof deck in staggered parallel adjacent courses that abut one another. The boards are generally fastened to the deck via nails or an adhesive, although other means of securing insulation board to roof deck are common in the art. Once the iso board of the present invention has been applied to a roof deck, the roof is completed by covering the substrate with a weather protective layer. The protective layer can include any system such as various types of modified bitumen or EPDM roofing membranes, or any other appropriate protective layers known in the art. In ballasted roofs, this protective layer is then covered with gravel, river stone or mixtures thereof; wherein the weight of the river stone serves a second function which is to secure the protective layer and underlying materials, such as the recovery boards, to the roof deck.

Figure 2:
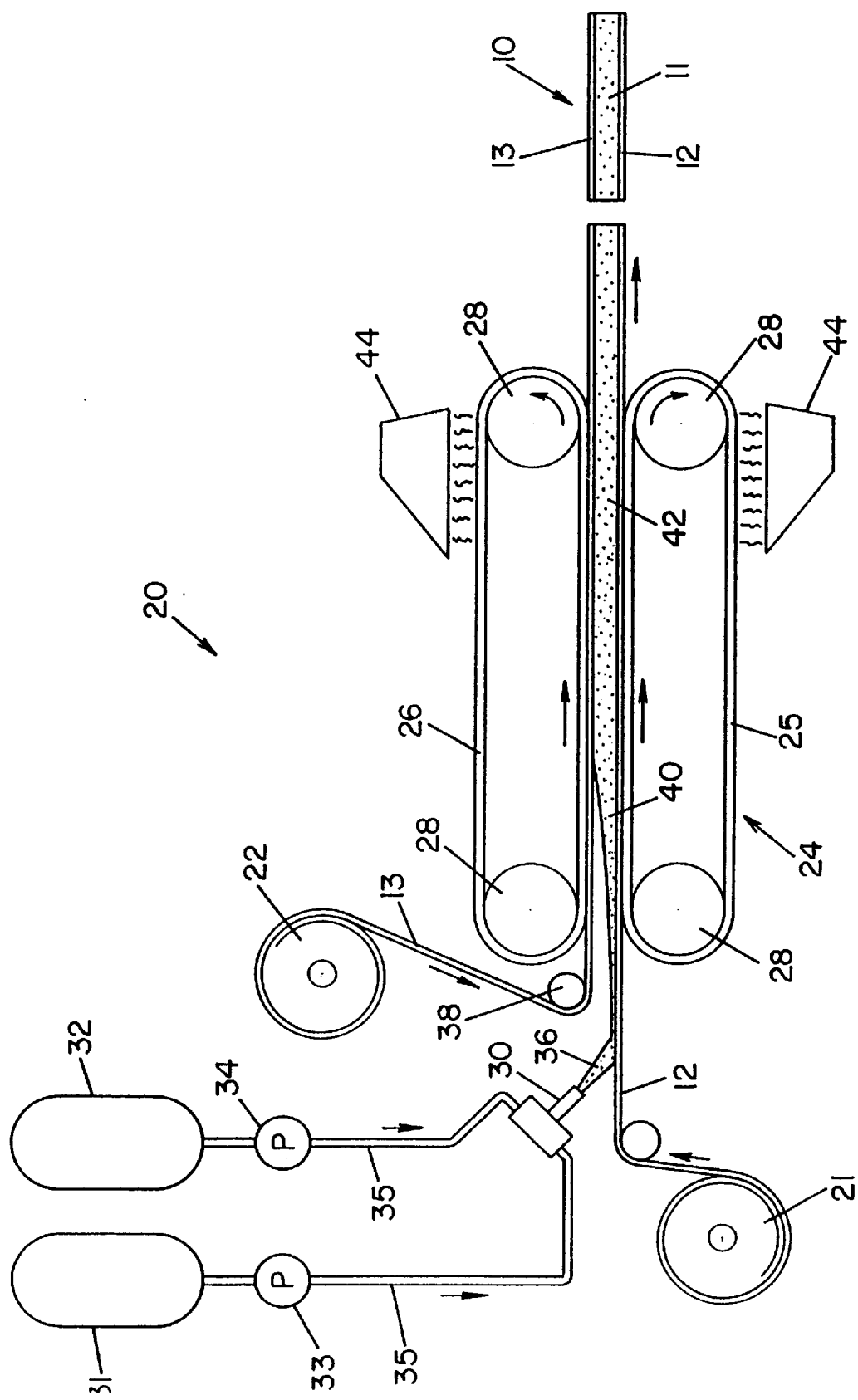
FIG. 2 is a schematic view of apparatus employed to manufacture composite iso boards of the present invention.

While the boards may be manufactured in a batch process, a continuous, on-line process is preferred as such a process is both efficient and economical. With reference to FIG. 2, a continuous process is schematically depicted in conjunction with apparatus 20. The apparatus provides lower and upper spools, 21 and 22 respectively, for lower and upper polyamide facers 12 and 13, which are positioned for feeding into a restrained rise laminator, generally 24, which comprises lower and upper continuous belts or treads, 25 and 26, reeved around a series of rolls 28, several of which are driven. The lower or bottom polyamide facer 12, is first fed into the laminator 24, resting on belt 25. Immediately above the facer 12, as it enters the laminator 24, is a foam mixhead 30. The mixhead 30 is fed from reservoirs 31 and 32, or whatever number are required by the polymer foam composition selected. Typically, there are two mixheads per laminator. Where the desired foam is a polyurethane, for instance, reservoir 31 can provide the isocyanate components and reservoir 32 the polyol components. The resin materials from these reservoirs are fed through metering pumps 33 and 34 and through appropriate conduits 35 into the mixhead 30, where upon contact, reaction commences to form the polymer foam.

The mixhead 30 then supplies an appropriate mixture 36 of resins from the reservoirs 31 and 32, as well as an appropriately metered amount, onto the surface of the moving facer 12. Subsequently, and slightly downstream of the mixhead 30, the upper polyamide facer 13 is fed into the laminator 24, passing around a feed roller 38, which positions the facer 13 against the upper belt 26. As the polyamide facers and deposited foamable composition in the cream state are conveyed, the latter rises, as depicted at 40, until the upper facer 13 is in complete contact with the upper belt 26. It is to be appreciated that the belts 25 and 26 are adjustable to accommodate the desired thicknesses of board 10.

During foaming, the temperature within the laminator is controlled between 100° F. and 200° F., so that the intermediate product, indicated by the numeral 42, is cured. This is accomplished by appropriately located heaters, generally 44, or by passage through an oven (not shown). After heating for the appropriate time (residence) and temperature, the product emerges from the laminator and is cut to length to produce the boards 10. Such cutting is within the skill of the art, including flying cut-off saws and the like, which provide desired dimensions without interruption of the apparatus 20. While lengths can be varied at will on such apparatus, the widths of the boards 10 can subsequently be trimmed to size in a separate operation, as necessary. It is also possible to provide sidewalls (not shown) in conjunction with the laminator 24, to define the desired widths as the polymer is foaming within the laminator conveyor.

In a typical manufacturing operation, the iso boards are then stacked to cool and continue curing. During this process, they are stacked to approximately 4 feet high. Heretofore, such stacking of boards employing plastic facers had to be carefully monitored and controlled, such as by providing a separator between adjacent boards, because while stacked, internal heat built up to about 300° F., which essentially caused the boards to fuse together. By use of the polyamide facers, according to the present invention, such temperatures do not have an adverse effect on the boards in their stacked position.

Moreover, the use of polyamide facers, such as polyamide 6,6, provides the further advantage of minimizing the influx of air or emissions, that is, release of the blowing agents employed in foaming. Because the polyamide 6,6 facers have very low permeability to passage of the blowing agents and air, as an example $(9 \times 10^{-13}$ cm$^3$ (cm)/(sec)(cm$^2$)(cm Hg)) for air, the iso boards have improved insulation value, generally a decrease in R-value of from 1 to 1.5 percent between 20 and 50 days, while for conventional boards, having paper/fiberglass facers, R-values decrease approximately 4 percent in the same time period. Low water absorption (less than 0.25 volume percent, as per ASTM C-209) also characterizes these facers and improves that property of the iso board.

EXAMPLES

In order to demonstrate the practice of the present invention, polyisocyanurate boards were produced on a commercial laminator using three different polyamide 6,6 films from Dupont Canada Inc. The plastic polyamide 6,6 films were C-917 (cast), C-203, and SF502, all of which were corona treated. The restrain rise laminator was set up for a two inch thick product. The boards were cut into 4'×8'×2" pieces. The formulation used for all three types of polyamide 6,6 film is set forth in Table I.

TABLE I

ISO Board Composition

| | PARTS BY WEIGHT |
|---|---|
| Polyester Polyol, 230L | 100.00 |
| HCFC-141b | 23.1 |
| HCFC-22 | 3.10 |

TABLE I-continued

ISO Board Composition

| | PARTS BY WEIGHT |
|---|---|
| Water | 0.40 |
| Silicone Surfactant, OSi L-5110 | 1.25 |
| Potassium Octoate, OMG 977 | 2.46 |
| Pentamethyldiethylenetriamine, Air Products Polycat 5 | 0.32 |
| Polymeric Diphenylmethane Diisocyanate | 155.0 |

Various physical tests were performed on the above boards made with the three types of Polyamide facers. The tests, as well as the results thereof, are displayed in Table II below.

TABLE II

Physical Properties

| FACER | C-917 CAST | C-203 | SF-502 |
|---|---|---|---|
| Physical Property: | | | |
| Core Density, pcf | 1.81 | 1.77 | 1.81 |
| 20 Day K-Factor | 0.147 | 0.143 | 0.135 |
| 50 Day K-Factor | 0.148 | 0.146 | 0.137 |
| Adhesion, psi (ASTM D 1623) | 6.3 to 10.7 | 5.6 to 10.2 | 4.9 to 8.0 |
| Water Absorption, % volume, (ASTM C 209) | 0.17 | 0.22 | 0.18 |

Core density, the inner 50 percent of full thickness, is representative of overall board performance and the values obtained demonstrate that these values are typical. The difference between the 20 and 50 Day K-Factors is an indication of the ability of the facer to eliminate or minimize the exchange of gases (air in, and carbon dioxide, HCFC-141b and HCFC-22 out) and show that these polyamide 6,6 facers slow down the exchange of gases thereby increasing the R-value or insulation property of these boards. As represented in Table II, adhesion was tested according to ASTM D 1623, and the data obtained on the tested boards indicate adhesion between facers and polyisocyanurate foam was good to excellent. Finally, water absorption, which is was measured using ASTM C 209, was improved over the standard fiberglass/paper facer which have water absorption values around 1.0 volume percent as per ASTM-C209.

Thus it should be evident that the device and methods of the present invention are highly effective in providing composite iso boards useful for roofing and reroofing as well as insulating boards for walls. The invention is particularly suited for reroofing, but is not necessarily limited thereto. The method of the present invention for manufacturing can be practiced with other equipment and, the method for reroofing can be practiced with the variety of iso boards that fall within the scope of the present invention.

Based upon the foregoing disclosure, it should now be apparent that the use of the iso boards described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, boards according to the present invention are not necessarily limited to those having a isocyanurate or polyurethane foam core. Moreover, as noted hereinabove, the composition of the polymer facer can be varied, particularly with the use of the optional fillers and

What is claimed is:

1. A composite iso recovery board comprising:

a foam core selected from the group consisting of polyisocyanurate and polyurethane materials and mixtures thereof; and first and second facers, between which said foam core is sandwiched, said facers comprising a polymer sheet selected from the group consisting of polyamides and polycarbonates.

2. A composite iso board, as set forth in claim 1, wherein said facers further contain a reinforcing material selected from the group consisting of glass strands, glass fibers, and mixtures thereof.

3. A composite iso board, as set forth in claim 1, wherein said polyamides are selected from the group consisting of polyamide 6,6, polyamide 6, polyamide 11, polyamide 12 and polyamide 6,10.

4. A composite iso board, as set forth in claim 1, wherein said polymer sheets optionally contain a filler selected from the group consisting of clay, mica, talc, limestone, gypsum, aluminum trihydrate, antimony oxide, cellulose fibers, plastic polymer fibers, and mixtures thereof.

5. A composite iso board, as set forth in claim 1, wherein said foam core comprises polyisocyanurate having an index above 200.

6. A composite iso board, as set forth in claim 1, wherein said foam core comprises polyurethane having an index above 120.

7. A composite iso board, as set forth in claim 1, wherein said facer has a thickness in the range from about 0.0005 to about 0.05 inches.

8. A composite iso board, as set forth in claim 2, wherein said facer comprises said reinforcing material in an amount from about 100 to about 10,000 parts by weight, based upon 100 parts by weight of the polymer selected to form the facer.

9. A composite iso board, as set forth in claim 1, wherein said polycarbonate is poly(4,4-isopropylidene diphenylene carbonate).

10. A composite iso board, as set forth in claim 1, wherein said facers further contain colorants.

* * * * *